(12) United States Patent
Gelmetti (10) Patent No.: US 7,950,523 B2
(45) Date of Patent: May 31, 2011

(54) RETAINER FOR A WELDING WIRE COIL

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 0 days.

(21) Appl. No.: 12/302,777

(22) PCT Filed: Mar. 30, 2007

(86) PCT No.: PCT/EP2007/002873
§ 371 (c)(1),
(2), (4) Date: Nov. 26, 2008

(87) PCT Pub. No.: WO2007/112972
PCT Pub. Date: Oct. 11, 2007

(65) Prior Publication Data
US 2010/0012540 A1    Jan. 21, 2010

(30) Foreign Application Priority Data

Mar. 30, 2006 (DE) .......................... 10 2006 014 843
May 16, 2006 (DE) .......................... 10 2006 022 841

(51) Int. Cl.
*B65D 85/04* (2006.01)
*B65H 49/00* (2006.01)
*B65H 55/02* (2006.01)
*B65H 57/18* (2006.01)

(52) U.S. Cl. ........ 206/408; 206/409; 242/129; 242/172; 242/423.1; 242/566

(58) Field of Classification Search .................. 206/388, 206/389, 408, 409; 242/128, 129, 137, 137.1, 242/156.1, 170–172, 423.1, 566
See application file for complete search history.

(56) References Cited

U.S. PATENT DOCUMENTS

| | | | |
|---|---|---|---|
| 2,864,565 A | 12/1958 | Whearley | |
| 4,582,198 A | 4/1986 | Ditton | |
| 4,869,367 A * | 9/1989 | Kawasaki et al. | 206/409 |
| 5,105,943 A | 4/1992 | Lesko et al. | |
| 5,277,314 A | 1/1994 | Cooper et al. | |
| 5,368,245 A * | 11/1994 | Fore | 242/171 |
| 5,485,968 A * | 1/1996 | Fujioka | 242/172 |
| 5,494,160 A | 2/1996 | Gelmetti | |
| 5,819,934 A | 10/1998 | Cooper | |
| 5,845,862 A * | 12/1998 | Cipriani | 242/423.1 |
| 6,016,911 A | 1/2000 | Chen | |
| 6,019,303 A | 2/2000 | Cooper | |
| 6,155,421 A | 12/2000 | Cooper | |
| 6,237,768 B1 | 5/2001 | Cipriani | |
| 6,260,781 B1 | 7/2001 | Cooper | |
| 6,464,077 B1 * | 10/2002 | Liu | 206/388 |
| 6,547,176 B1 * | 4/2003 | Blain et al. | 242/423.1 |
| 6,564,943 B2 | 5/2003 | Barton et al. | |

(Continued)

FOREIGN PATENT DOCUMENTS

DE     103 60 466     7/2005

(Continued)

*Primary Examiner* — Byron P Gehman
(74) *Attorney, Agent, or Firm* — Hayes Soloway P.C.

(57) ABSTRACT

A retainer for a welding wire coil has a plurality of fingers (38) and a base element (32) with an upper surface (34) and a lower surface (36), the fingers (38) extending downwardly beyond the lower surface (36) of the retainer (12).

3 Claims, 10 Drawing Sheets

U.S. PATENT DOCUMENTS

| | | | |
|---|---|---|---|
| 6,636,776 B1 | 10/2003 | Barton et al. | |
| 6,648,141 B2 * | 11/2003 | Land | 206/408 |
| 6,649,870 B1 | 11/2003 | Barton et al. | |
| 6,745,899 B1 | 6/2004 | Barton | |
| 6,749,136 B1 | 6/2004 | Speck | |
| 6,889,835 B2 * | 5/2005 | Land | 206/408 |
| 6,913,145 B2 * | 7/2005 | Barton et al. | 206/409 |
| 6,938,767 B2 | 9/2005 | Gelmetti | |
| 6,977,357 B2 | 12/2005 | Hsu et al. | |
| 7,004,318 B2 | 2/2006 | Barton | |
| 7,147,176 B2 | 12/2006 | Rexhaj | |
| 7,156,334 B1 * | 1/2007 | Fore et al. | 242/171 |
| 7,178,755 B2 | 2/2007 | Hsu et al. | |
| 7,198,152 B2 | 4/2007 | Barton et al. | |
| 7,309,038 B2 | 12/2007 | Carroscia | |
| 7,377,388 B2 * | 5/2008 | Hsu et al. | 206/389 |
| 7,410,111 B2 | 8/2008 | Carroscia | |
| 7,441,721 B2 * | 10/2008 | Bae et al. | 242/128 |
| 2006/0027699 A1 | 2/2006 | Bae et al. | |
| 2007/0272573 A1 | 11/2007 | Gelmetti | |
| 2009/0014572 A1 | 1/2009 | Weissbrod et al. | |
| 2009/0014579 A1 | 1/2009 | Bender et al. | |

FOREIGN PATENT DOCUMENTS

| | | |
|---|---|---|
| EP | 1 295 813 | 3/2003 |
| EP | 1 698 421 | 6/2006 |
| GB | 2 332 451 | 6/1999 |
| JP | 1-65265 | 4/1989 |
| JP | 3-264169 | 11/1991 |
| JP | 4-112169 | 4/1992 |
| JP | 5-178538 | 7/1993 |
| JP | 8-40642 | 2/1996 |
| JP | 2000-202630 | 7/2000 |
| JP | 2001-26375 | 1/2001 |
| JP | 2007-927 | 1/2007 |
| JP | 2007-29971 | 2/2007 |
| KR | 2002-0077857 | 10/2002 |
| WO | WO 2005/061168 | 7/2005 |
| WO | WO 2007/149689 | 12/2007 |
| WO | WO 2009/007845 | 1/2009 |

* cited by examiner

RETAINER FOR A WELDING WIRE COIL

The invention relates to a retainer for a welding wire coil.

A welding wire container in which a welding wire coil is arranged is known from EP 1 295 813 A2. In order to prevent the wire of the coil from becoming entangled when the wire is withdrawn from the container, a retainer is provided which is arranged on top of the coil. Basically, the retainer is formed as a plate which rests on top of the welding wire coil. Due to its weight, the retainer is movable, preventing the individual turns of the wire from overlapping and forming tangles so that the wire can be withdrawn from the container without interruptions.

The problem is that the top surface of the welding wire coil does not always remain in the flat and level position in which the turns of the wire were originally arranged in the interior of the container. During transportation of the container accommodating the welding wire coil, vibrations might cause the welding wire to settle and sag inwardly. Accordingly, the top surface of the welding wire coil is no longer flat and level but has an upper surface which represents a portion of a cone with the inner portion of the upper coil surface being at a lower level than its outer portion. This results in a retainer not contacting the entire upper surface of the welding wire coil. Accordingly, the welding wire not in contact with the retainer is not held in its proper position by the retainer and can entangle.

The object of the present invention is to provide a retainer which perfectly holds the welding wire in its proper position, even if the welding wire coil settles during transportation.

For this purpose, the invention provides a retainer for a welding wire coil, which has a base element with an upper surface and a lower surface, and a plurality of fingers, the fingers extending downwardly beyond the lower surface of the retainer. The fingers reach to a point in the interior of the welding wire coil which is at a lower level than the base element. The fingers are permanently in contact with the welding wire. The fingers provide a precisely defined contact between the welding wire coil and the retainer, this contact being sufficient for preventing the wire from becoming entangled. The fingers engage the welding wire coil such that the welding wire cannot settle and sag uncontrolled inwardly.

According to an embodiment, two elements are provided, namely a base element and a top element, the top element having the fingers. The top element is arranged on top of the base element and rests there due to its own weight. In other words, the top element of the retainer can be held spaced apart from the base element by the fingers lying on top of the welding wire coil. No additional element is necessary to hold the top element spaced apart from the base element. The retaining effect is provided by the base element of the retainer which contacts the upper surface of the welding wire coil and by the fingers of the top element which assist in holding the respective upper welding wire turns at their correct positions.

Preferably, the fingers have a downwardly projecting guiding portion. The guiding portion is held within a slot of the base element so as to more precisely define the position of the top element with respect to the base element.

According to another embodiment, the fingers are part of the base element. The fingers are formed as an integral part of the base element. Therefore, no additional top element is necessary.

Further features and advantages of the invention will be apparent from the following description of the embodiments and the attached drawings to which reference is made and in which.

Figure 1:
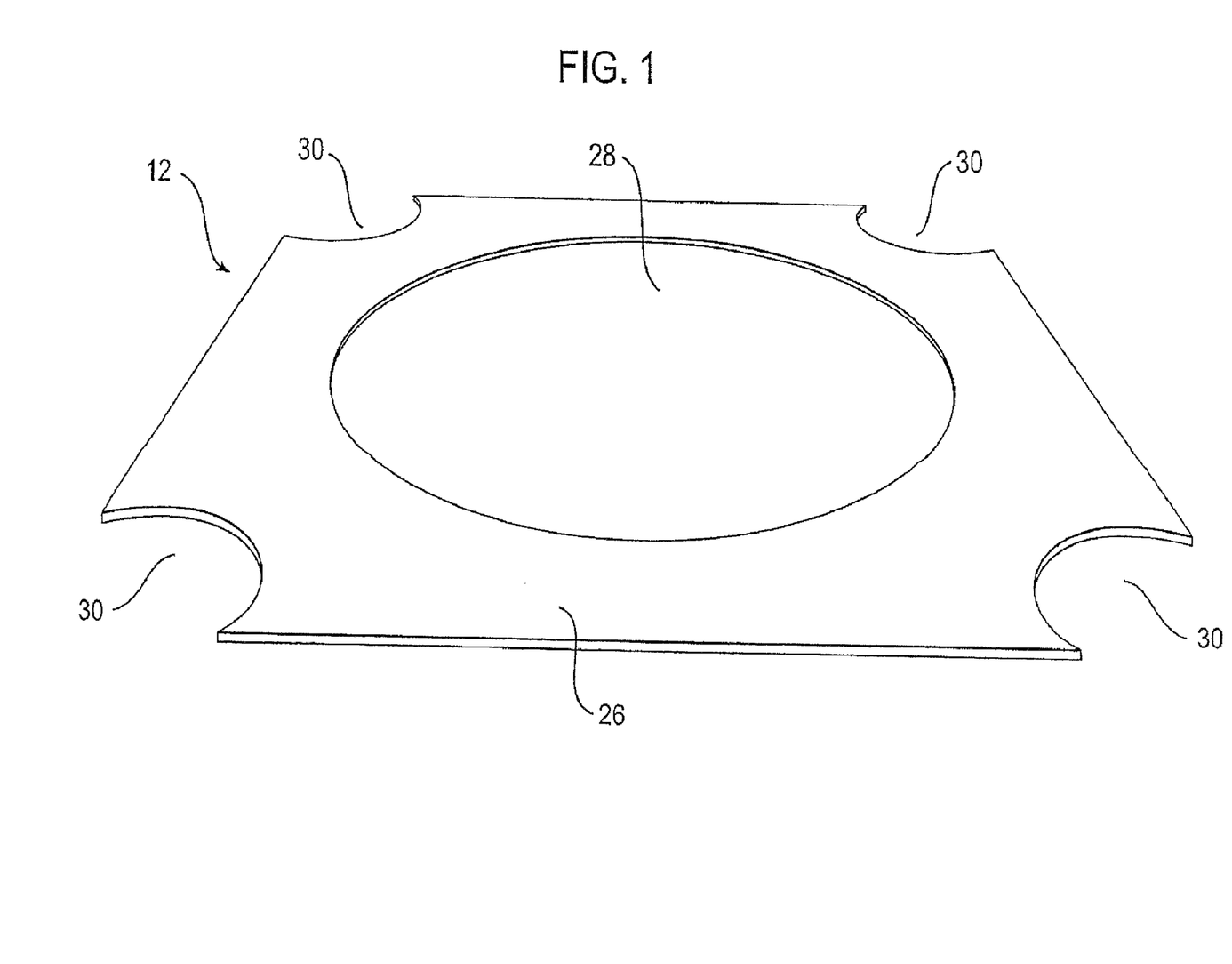
FIG. 1 shows a schematic, perspective view of a welding wire retainer according to the prior art.
Figure 2:
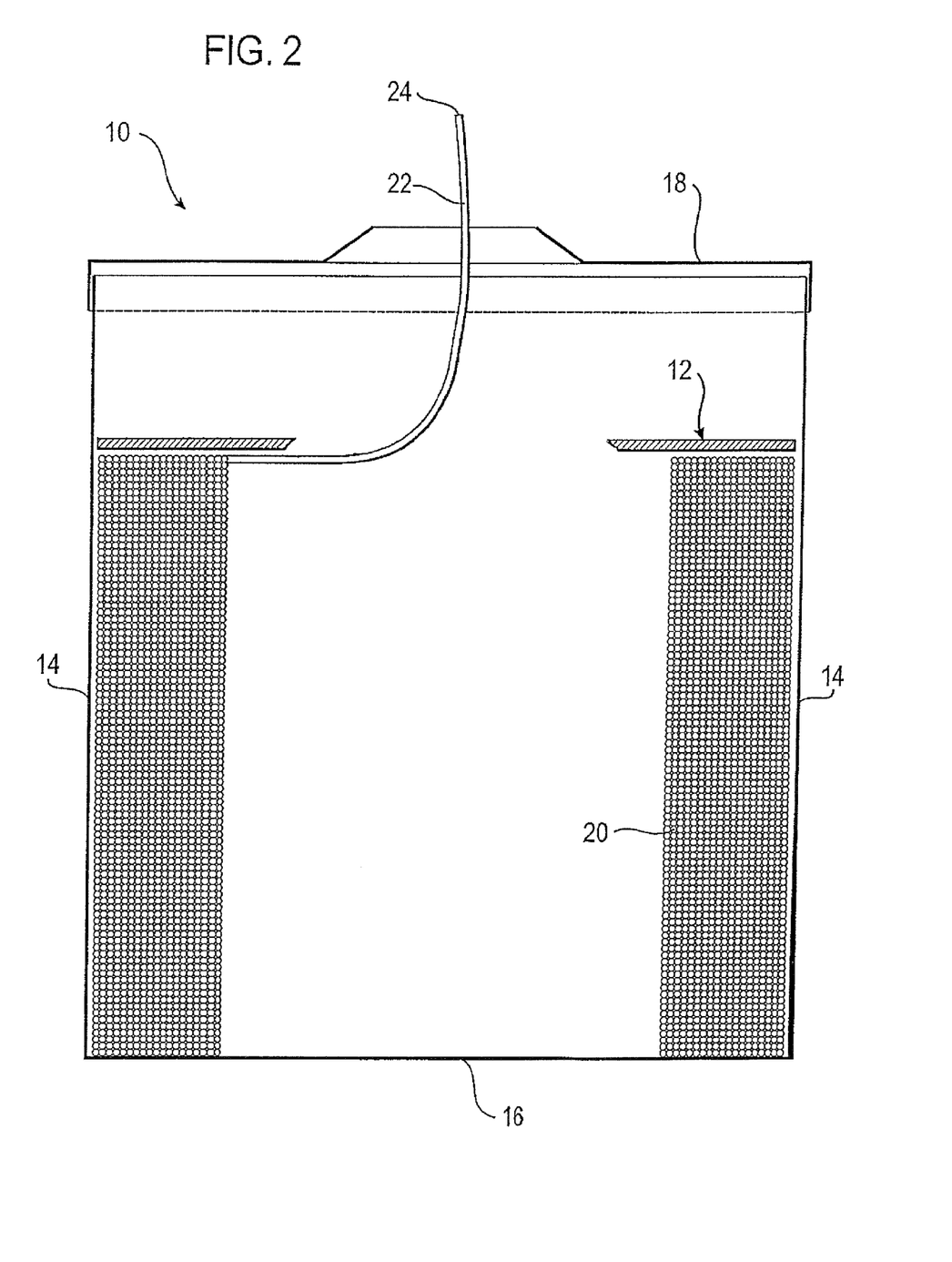
FIG. 2 shows a side view of a welding wire container with the retainer of FIG. 1 in an initial condition.
Figure 3:
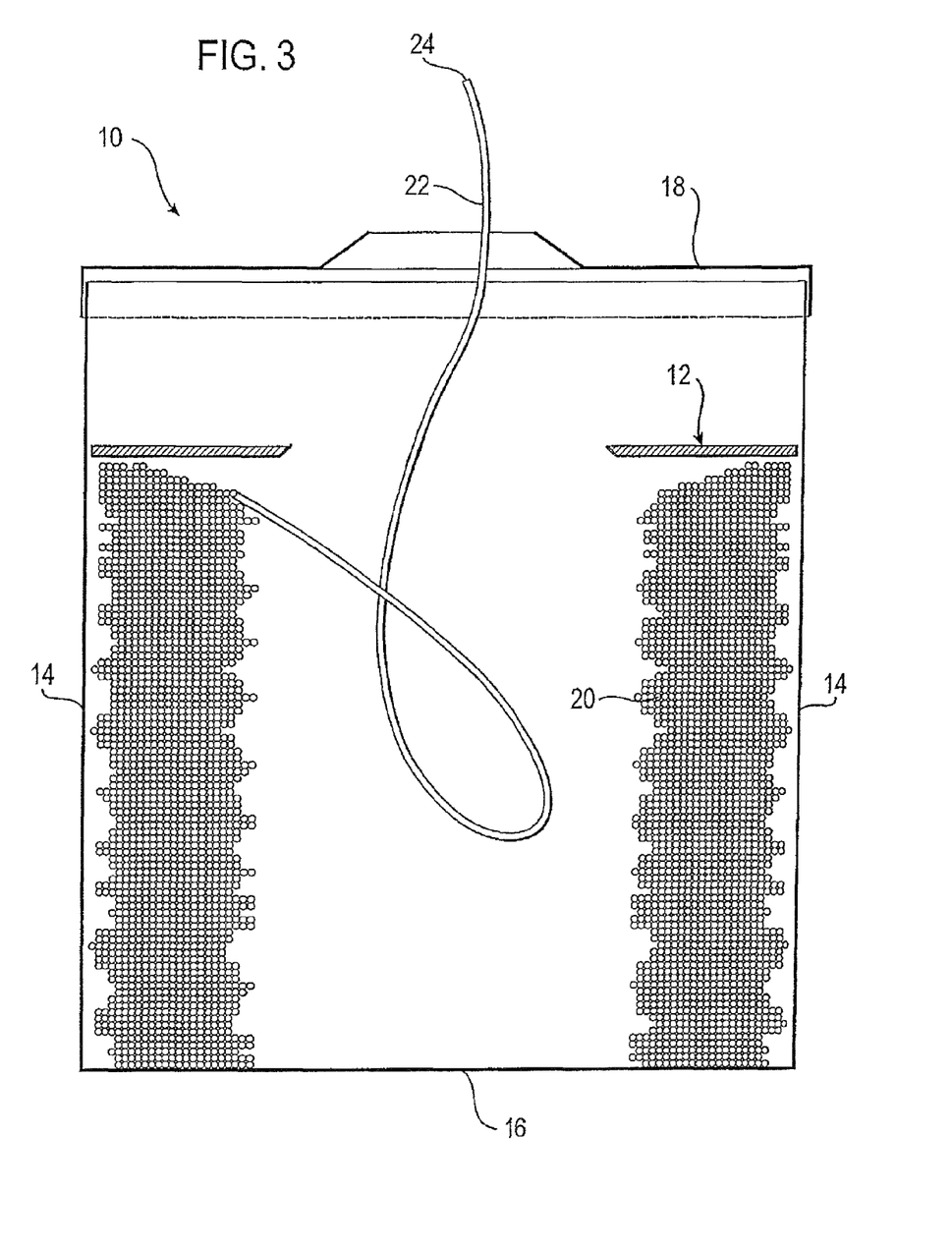
FIG. 3 shows a side view of a welding wire container with the retainer of FIG. 1 in a second condition.

A welding wire container 10 with a welding wire retainer 12 as known from the prior art is shown in FIGS. 1 to 3. The container 10 has a rectangular cross section, side walls 14 (two side walls are shown), a bottom 16 and a lid 18.

In the interior of the container 10, a welding wire coil 20 is accommodated. The welding wire coil 20 consists of a certain amount of welding wire 22 which is coiled so as to form a hollow body with a ring-shaped cross section. The beginning of the welding wire 22 is designated with reference number 24, and the end portion of the welding wire 22 can be fixed to the bottom 16 (not shown).

On the upper side of the welding wire coil 20, the retainer 12 is provided. The retainer 12 has a plate-like body 26 (please see FIG. 1) with a central opening 28 and one recess 30 in each corner to receive reinforcement elements (not shown), which are arranged in the corners of the container 10 to increase the stability of the container 10.

The retainer 12 lies on the upper side of the welding wire coil 20, the retainer 12 being always parallel to the lid 18.

During transportation of the container 10, vibrations might cause the welding wire 22 to settle and sag inwardly. Accordingly, the top surface of the welding wire coil 20 is no longer flat and level but has an upper surface which represents a portion of a cone with the inner portion of the upper coil surface being at a lower level than its outer portion. Then, the retainer 12 can not adapt on the top surface of the welding wire coil 20 and can not contact the entire upper surface of the welding wire coil 20. Therefore, the welding wire 22 is not held in its proper position by the retainer 12 and can entangle.

Figure 4:
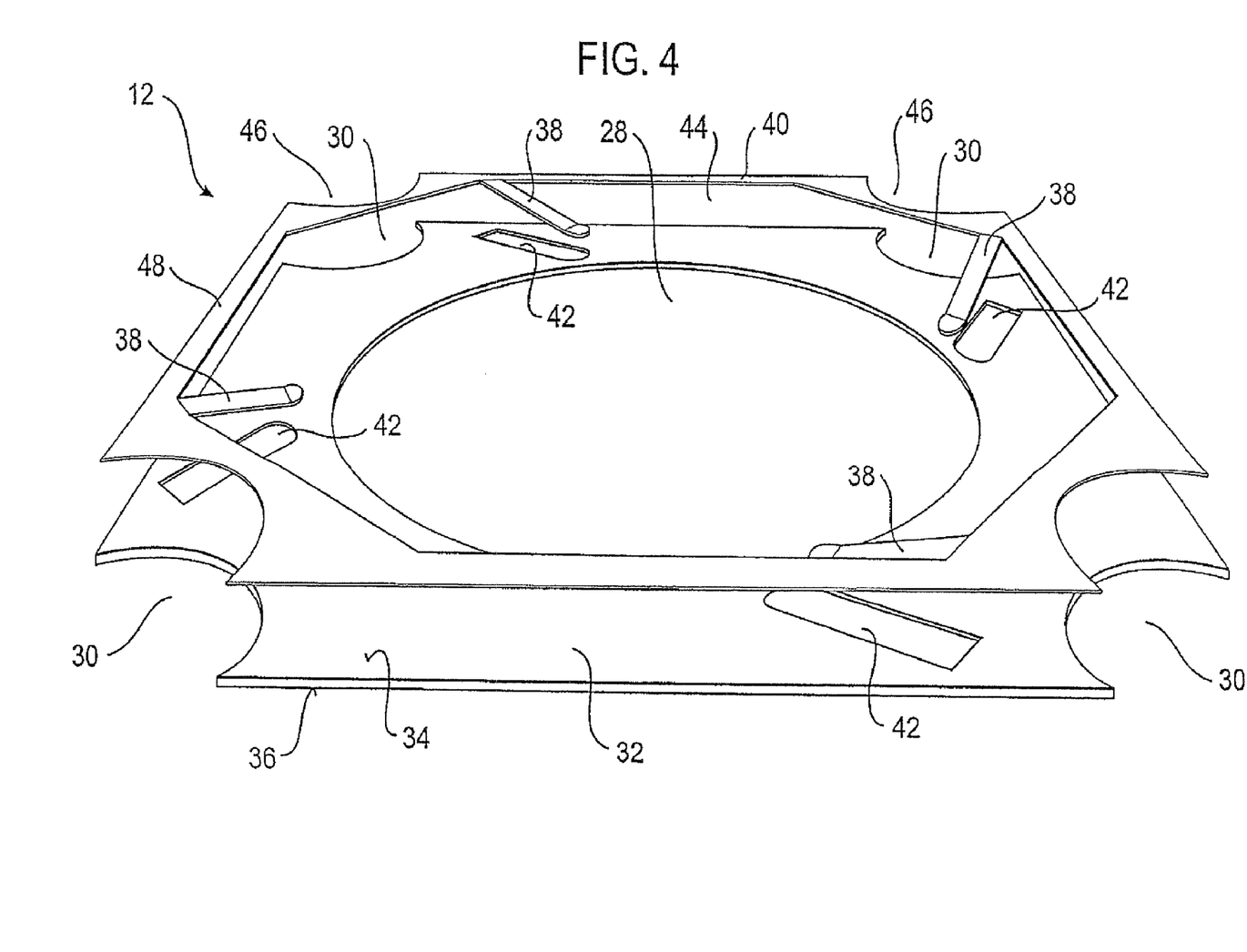
FIG. 4 shows a perspective view of a retainer according to a first embodiment of the invention.
Figure 5:
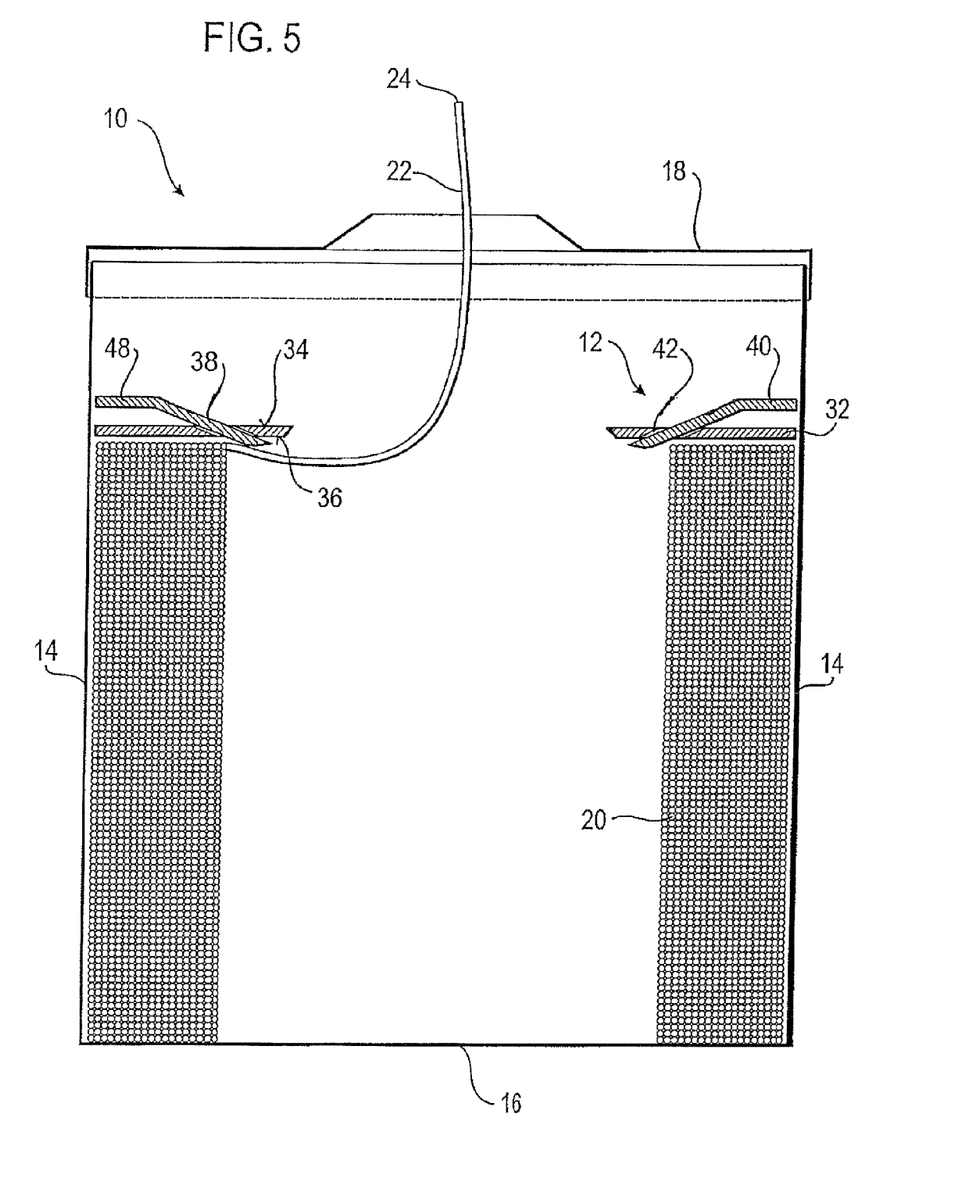
FIG. 5 shows a side view of a welding wire container with the retainer of FIG. 4 in an initial condition.
Figure 6:
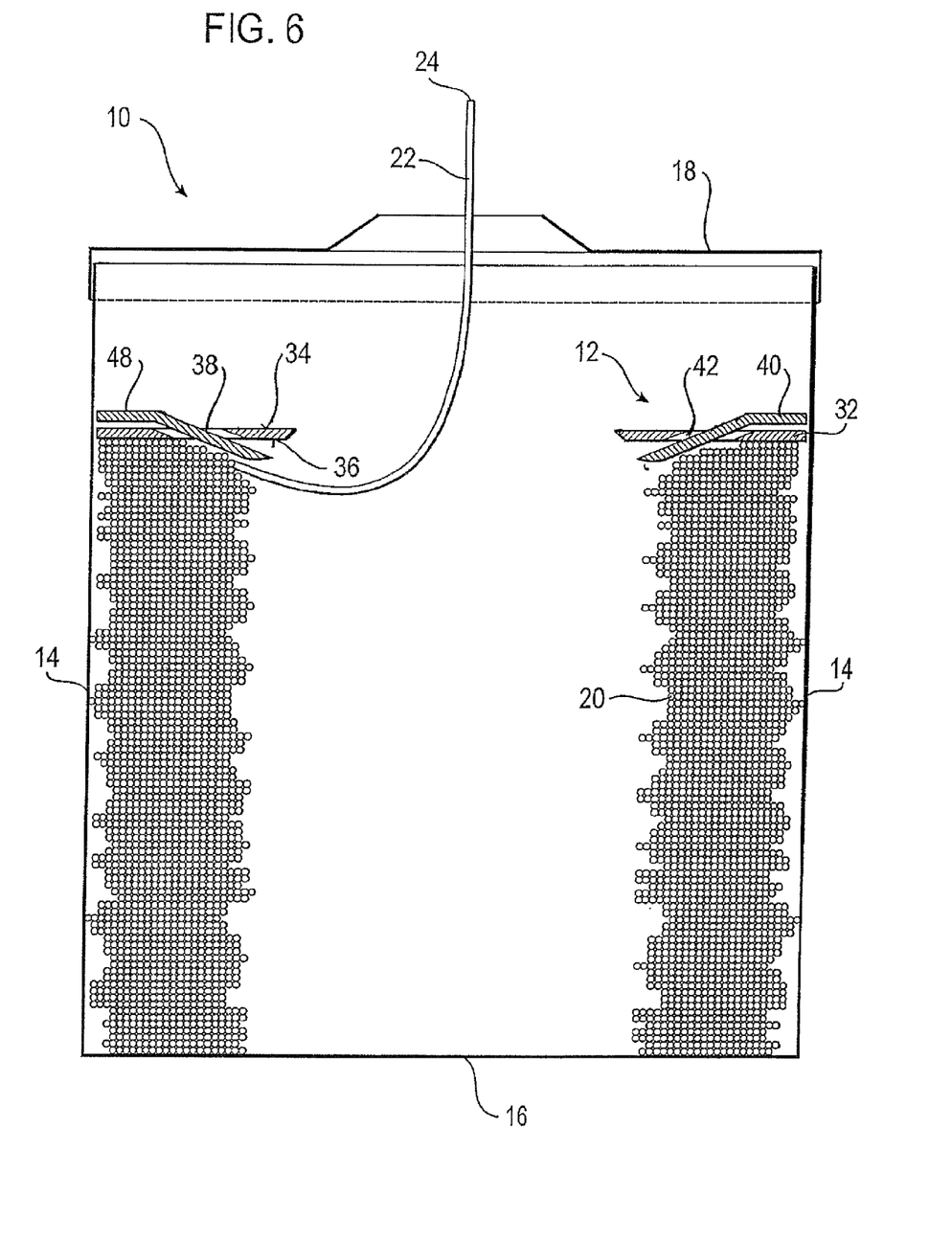
FIG. 6 shows a side view of a welding wire container with the retainer of FIG. 4 in a second condition.
Figure 7:
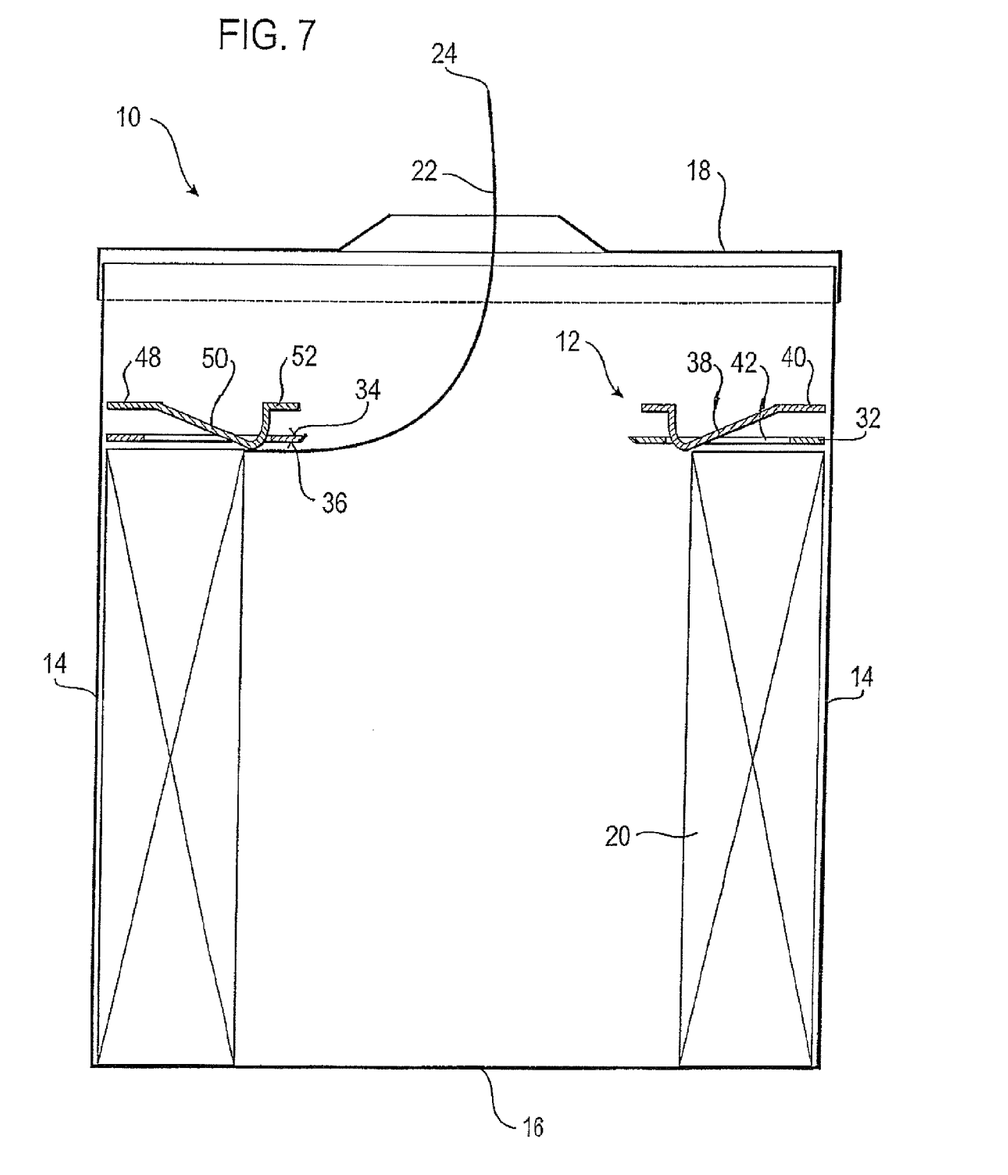
FIG. 7 shows a side view of a welding wire container with a retainer according to a second embodiment of the invention in an initial condition.
Figure 8:
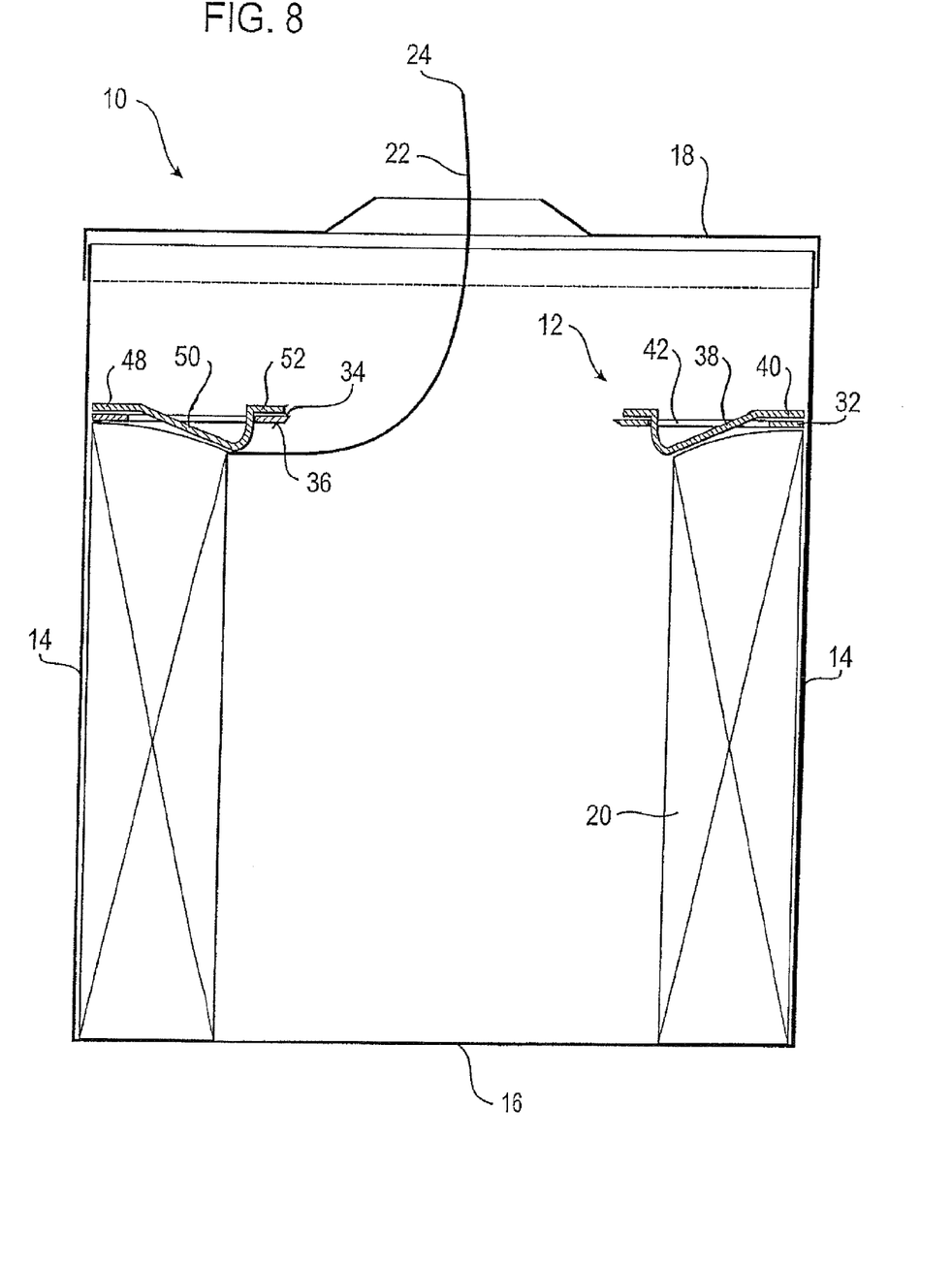
FIG. 8 shows a side view of the welding wire container with the retainer of FIG. 7 in a second condition.
Figure 9:
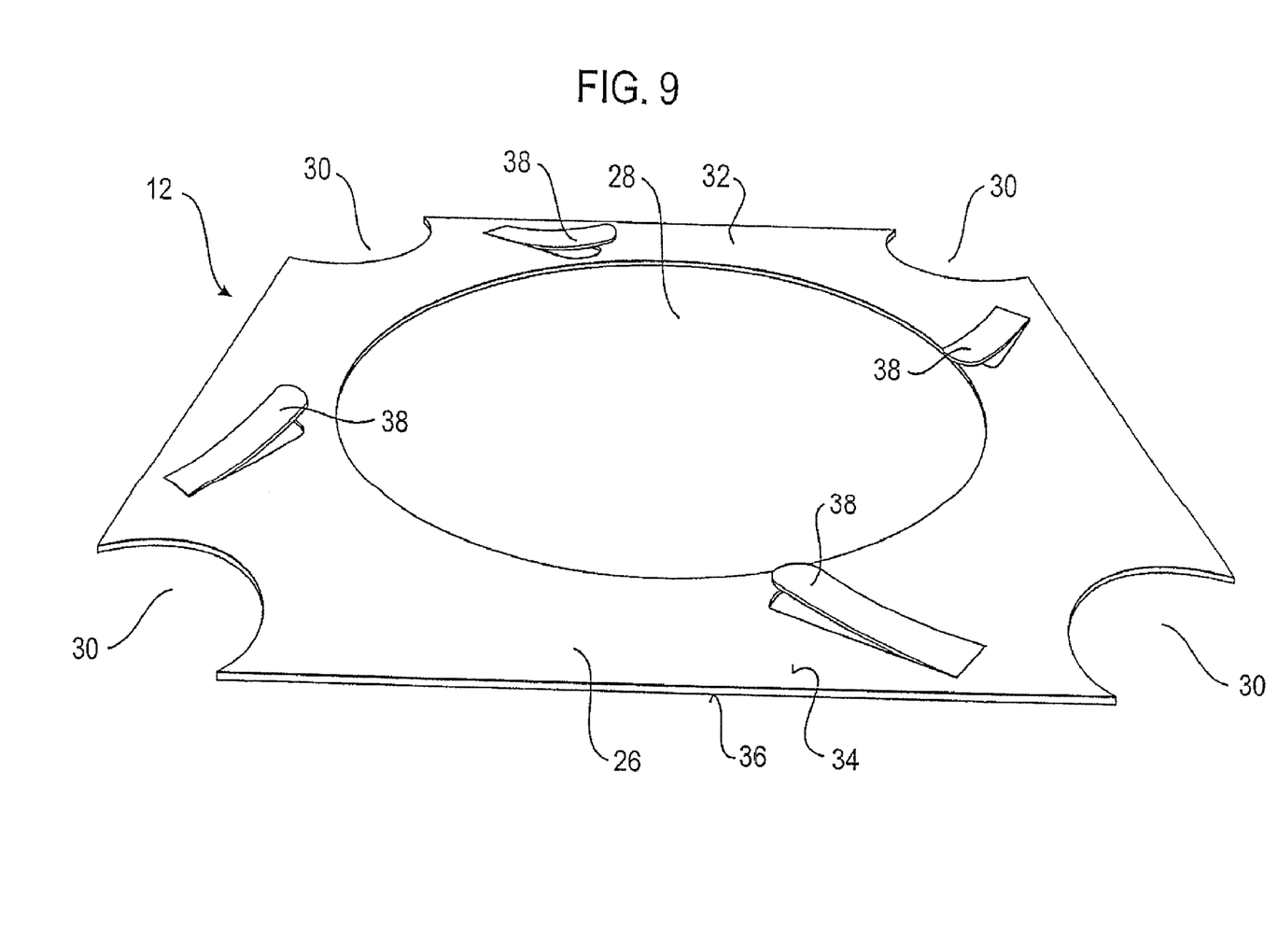
FIG. 9 shows a perspective view of a retainer according to a third embodiment of the invention.
Figure 10:
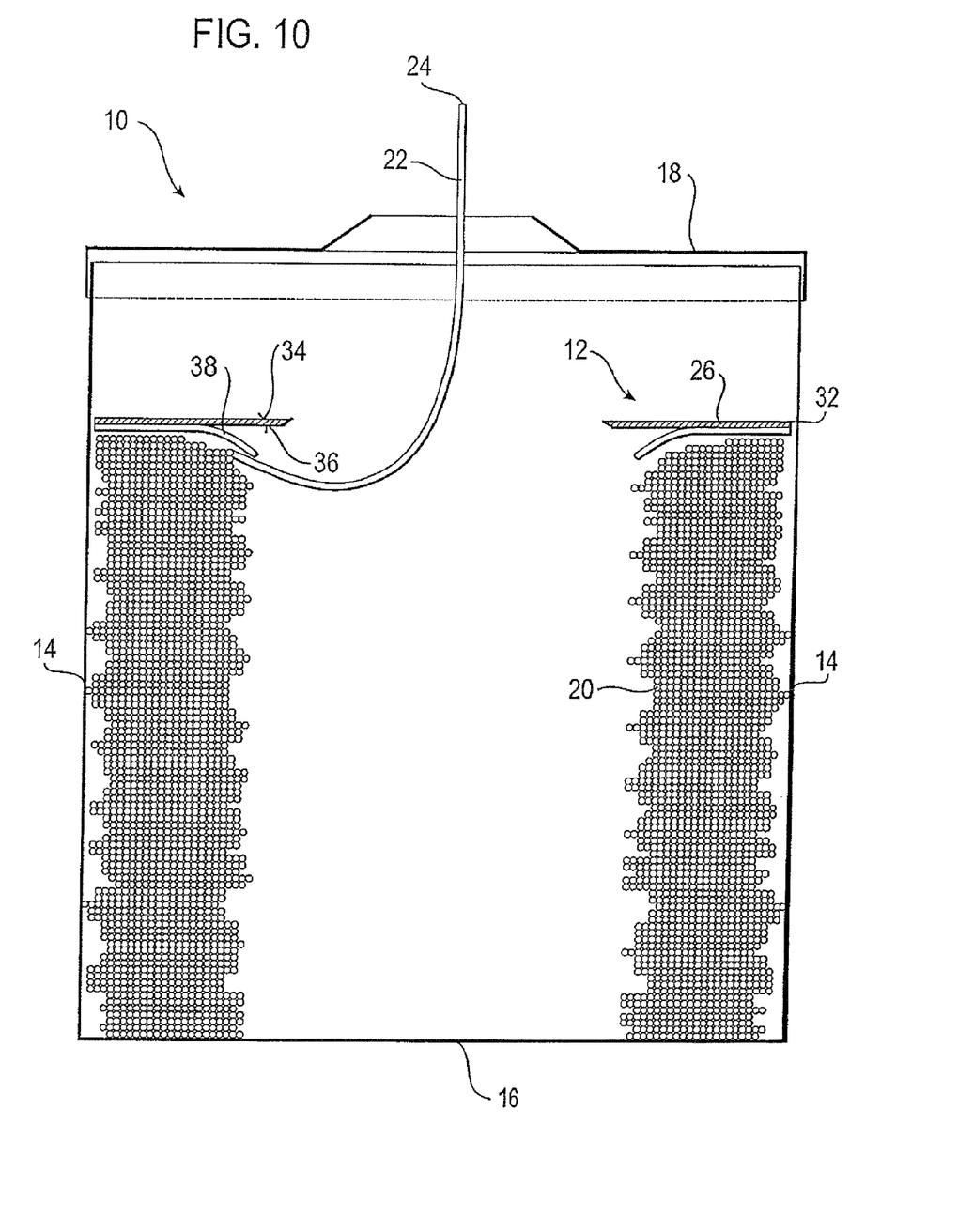
FIG. 10 shows a side view of a welding wire container with the retainer of FIG. 9.

Different embodiments of the retainer 12 according to the invention are described in the following, with FIGS. 4 to 6 showing a first embodiment, FIGS. 7 and 8 showing a second embodiment and FIGS. 9 and 10 showing a third embodiment.

Each retainer 12 has a plate-like base element 32 with a central opening 28 and four recesses 30 for receiving not shown reinforcement elements. The reinforcement elements are arranged in the corners of the container 10 to increase the stability of the container 10. The base element 32 comprises an upper surface 34 and a lower surface 36. The lower surface 36 can engage the top surface of the welding wire coil 20.

Each retainer 12 has four fingers 38 extending downwardly beyond the lower surface 36 of the retainer 12 to engage the welding wire coil 20 and hold the welding wire 22 in its proper position as to prevent entangling of the welding wire 22. The fingers 38 extend in a direction which is oblique with respect to the plane in which the base element 32 lies. In particular, the fingers 38 reach to a point in the interior of the welding wire container 10 which is at a lower level than the base element 32. Of course, the number of fingers can vary so that more or less than four fingers can be arranged.

In the following, the embodiments will be discussed one by one.

FIGS. 4 to 6 show the retainer 12 for the welding wire coil 20 in the first embodiment.

The retainer 12 has two parts, namely the base element 32 which sits on the upper surface of the welding wire coil 20, and a top element 40, the top element 40 being arranged on top of the base element 32.

The base element 32 has four slots 42, the fingers 38 being arranged at positions corresponding to the slots 42 of the base element 32 so that each finger 28 extends through one of the slot 42. The fingers 38 are part of the top element 40.

The top element 40 is frame-like and has a polygonal central opening 44. The top element 40 comprises four recesses 46, one recess 46 being positioned in a corner for receiving the reinforcement elements (not shown).

FIG. 5 shows the welding wire coil 20 in its initial condition in which the top surface of the coil 20 is flat and level. Here, there is a surface contact between the flat base element 32 of the retainer 12 and the top surface of the coil 20. The top element 40 of the retainer 12, in particular its frame-like portion 48, is held spaced apart from the base element 32 as the fingers 38, with their inner ends, lie on top of the welding wire coil 20. Especially, the fingers 28 lie on the inner portion of the coil 20. The top element 40 which is arranged on top of the base element 32 rests there due to its own weight. No additional biasing means are provided. The basic retaining effect is provided by the base element 32 of the retainer 12 which contacts the top surface of the welding wire coil 20. Additional retaining effect is provided by the four fingers 38 which assist in holding the respective upper welding wire 22 at its correct position.

FIG. 6 shows the welding wire coil 20 in a second condition in which the welding wire 22 has sagged inwardly. The surface of the welding wire coil 20 is no longer flat and level but has an upper surface which represents a portion of a cone with the inner portion of the coil 20 being at a lower level as its outer portion. The top element 40 has moved downwardly with respect to the base element 32 under its own weight because the fingers 38 are still in contact with the top surface of the welding wire coil 20, especially the inner portion of the coil 20, and the inner portion is in this condition at a lower level than in its initial condition and oblique with respect to the plane in which the base element 32 lies.

The base element 32 basically serves for retaining the welding wire 22 in the radially outward portions of the welding wire coil 20 while the fingers 38 of the top element 40 retain the welding wire 22 at the four locations where the fingers 38 are provided.

FIGS. 7 and 8 show a second embodiment of the retainer 12.

This embodiment differs from the first embodiment in that the fingers 38 are bent twice at their inner ends. The innermost part 52 of each finger 38 is in the same plane as the frame-like portion 48 of the top element 40 and increase the stability of the fingers 38. The innermost part 52 can lie on the base element 32. The fingers 38 have a downwardly projecting guiding portion 50 which merges with the frame-like portion 48. Each finger 38 is held within the slot 42 in the base element 32 so as to more precisely define the position of the top element 40 with respect to the base element 32.

FIG. 7 shows the welding wire coil 20 in its initial condition in which the top surface of the coil 20 is flat and level. The top element 40 of the retainer 12 is held spaced apart from the base element 32 as the fingers 38 lie on top of the welding wire coil 20.

FIG. 8 shows the welding wire coil 20 in a second condition in which the welding wire 22 is sagged inwardly. The fingers 38 are still in contact with the inner portion of the welding wire coil 20, but the top element 40 has moved downwardly with respect to the base element 32 under its own weight, because the inner portion of the coil 20 is oblique with respect to the plane in which the base element 32 lies and at a lower level than in its initial condition.

FIGS. 9 and 10 show a third embodiment of the retainer 12 for the welding wire coil 20.

The fingers 38 are formed as an integral part of the base element 32. Especially the fingers 38 are bent out of the plane in which the remaining part of the base element 32 lies. The force with which the fingers 38 contact the top of the welding wire coil 20 changes. In the initial condition, the contact force is at its maximum. When the welding wire 22 settles (FIG. 10), the contact force reduces.

It has been found out that better results can be achieved with fingers 38 which contact the top surface of the welding wire coil 20 with a constant contact force independently of their particular position.

The following concerning each of the three embodiments. By varying the angle of the fingers 38 and the weight of the top element 40, the retaining effect can be adjusted to the particular requirements.

The invention claimed is:

1. A retainer for a welding wire coil, having
   a base element comprised of two separate elements, (i) a lower element comprising a plurality of slots, and (ii) a top element, wherein the base element has an upper surface and a lower surface,
   a plurality of fingers integrally formed as part of the top element, the fingers extending downwardly through the slots in the lower element and beyond the lower surface of the base element; wherein
   the fingers extend in a direction which is oblique with respect to a plane in which the base element lies.

2. The retainer for a welding wire coil of claim 1, wherein the top element is arranged on top of the lower element and is freely movable with respect to the lower element.

3. The retainer for a welding wire coil of claim 1, wherein the fingers have a downwardly projecting guiding portion.

* * * * *